C. G. DUFFY & J. R. WHITED.
CAR STEP.
APPLICATION FILED APR. 24, 1911.
1,043,215.
Patented Nov. 5, 1912.
2 SHEETS—SHEET 1.
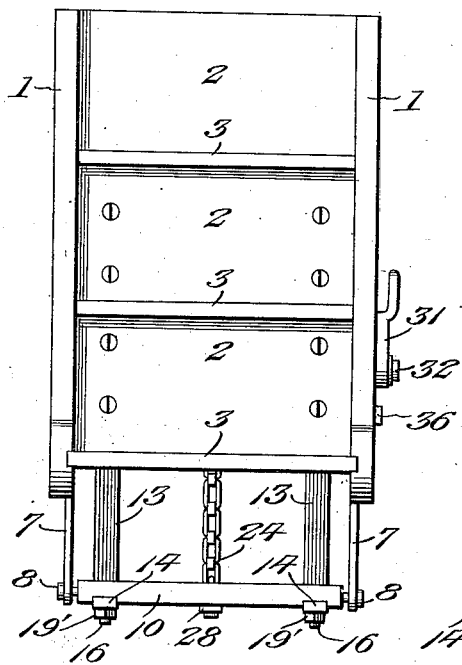
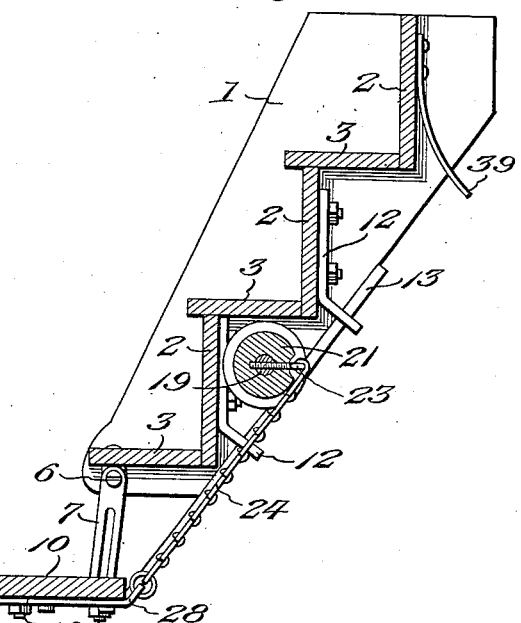
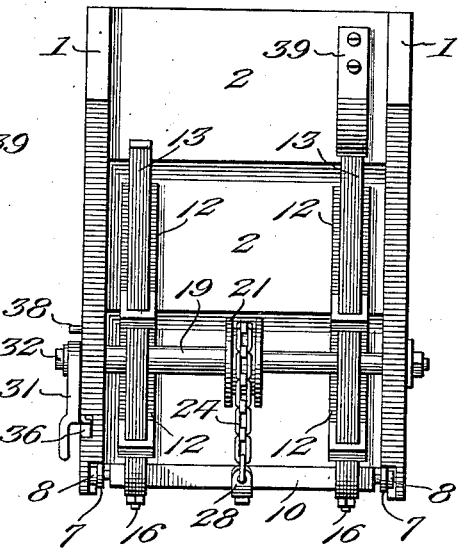
Witnesses
Edwin G. McKee
A. R. Farnham
Inventors
Chas. G. Duffy
James R. Whited
By Geo. W. Suls.
Attorney C. G. DUFFY & J. R. WHITED.
CAR STEP.
APPLICATION FILED APR. 24, 1911.
1,043,215.
Patented Nov. 5, 1912.
2 SHEETS—SHEET 2.
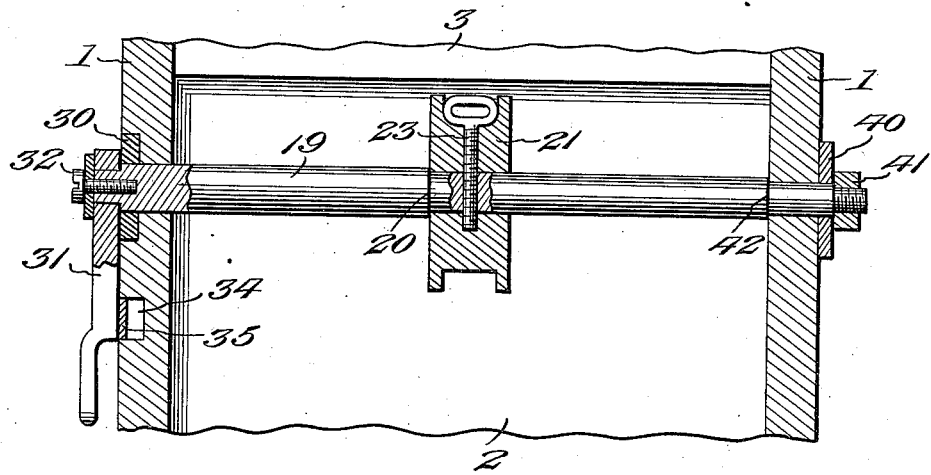
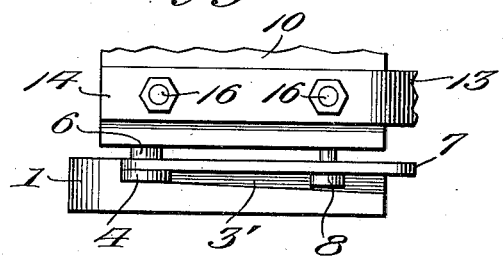
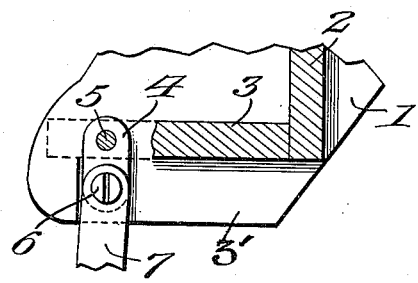
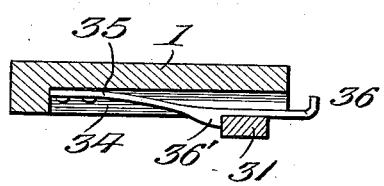
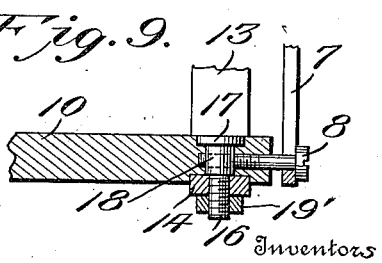
Witnesses
Edwin F. McKee
A. R. Farnham
Inventors
Chas G. Duffy
James R. Whited
By Geo. W. Suls.
Attorney

UNITED STATES PATENT OFFICE.

CHARLES G. DUFFY AND JAMES R. WHITED, OF STONEGA, VIRGINIA; SAID WHITED ASSIGNOR TO SAID DUFFY.

CAR-STEP.

1,043,215.  Specification of Letters Patent.  Patented Nov. 5, 1912.

Application filed April 24, 1911. Serial No. 623,082.

*To all whom it may concern:*

Be it known that we, CHARLES G. DUFFY and JAMES R. WHITED, citizens of the United States, and residents of Stonega, in the county of Wise and State of Virginia, have invented certain new and useful Improvements in Car-Steps, of which the following is a specification, reference being had to the accompanying drawings.

This invention has relation to certain new and useful improvements in auxiliary steps employed in connection with the steps of passenger coaches and cars; and the object of our invention is to provide a device of this general character of a simple and inexpensive nature and of a durable and neat construction which shall be capable of being securely held out of position when not needed and arranged to be instantly sprung into position when it is desired to add an additional tread to the permanent step of the car or coach.

With these and other objects in view the present invention consists in the combination and arrangement of parts as will be hereinafter more fully described and finally pointed out in the appended claims, it being further understood that changes in the specific structure shown and described may be made within the scope of the claims, without departing from the spirit of the invention.

In the accompanying drawings forming a part of this specification, and in which like numerals of reference indicate similar parts in the several views: Figure 1, is a front view showing the auxiliary step as lowered. Fig. 2, is a lengthwise sectional view through Fig. 1. Fig. 3, is a side view with parts broken away showing the auxiliary step as raised. Fig. 4, is a rear view. Fig. 5, shows an enlarged detached detail of the spool shaft. Fig. 6, shows a fragmentary portion of one of the bridgeboards. Fig. 7, shows an enlarged fragmentary detail disclosing the position of one of the swinging ears. Fig. 8, is a detail of the detent, and Fig. 9, shows the arrangement of securing the hanger supporting bolt.

Car steps as ordinarily constructed and used in connection with passenger coaches terminate a considerable distance above the ground, owing to the fact that the step cannot be projected very far beyond the side of the car. This then leaves the last step so high above the ground that it is difficult for women, children and the aged and infirm to enter and leave the car. Some railroads provide a small portable stool or bench which is placed in position by a car attendant, serving as an addition to the step.

In order that all passenger cars and coaches may be provided with a comparatively inexpensive, readily operated auxiliary step, we provide the device as described in the following specification.

In the accompanying drawings the numerals 1, 1, designate the two bridgeboards of a car step, 2, the risers and 3, the treads. At the lower end each bridgeboard 1, is provided with a recess 3', along the inner edge, as shown in Figs. 6 and 7. Extending into each recess 3', is an ear 4, each ear being held upon a pivot bolt 5, and carrying a bolt 6. These ears, as shown in Fig. 7, are positioned between the lowermost tread and the bridgeboards. Pivotally held to each bolt 6, is a slotted hanger 7, each hanger at its lower end being slidably connected by means of a trunnion bolt 8, to a tread 10, as disclosed in Fig. 9, this tread 10, forming the auxiliary step.

Extending rearwardly from two suitable risers of the step as shown in Fig. 2, are the brackets 12, 12, four such brackets being used, as will be understood in referring to Fig. 4. Each bracket at its lower end, which is bent obliquely outward, has a square opening and slidably held within the square openings of these hangers 12, are the two supporting bars 13, each ending in an obliquely extending end 14, to which ends the tread 10, is secured in the manner shown in Fig. 2. Each tread 10, has four bolt openings arranged to receive the bolts 16, each bolt having an enlarged head 17, and a collar portion 18, the bar ends 14, working against the collar portions 18, and held thereto by means of suitable nuts 19', shown in Fig. 9. As explained, four such bolts 17, are employed. Threading into the two rearmost bolts 17, are the trunnion bolts 8, each trunnion bolt working into a suitable opening within a collar portion 18. In Fig. 9, one of these trunnion bolts 8, is shown as held within the slot of a hanger 7. From the foregoing description it will be noticed that each hanger 7, at one end is pivotally connected to a bolt 6, carried by an ear 4, while the opposite slotted end of each hanger 7, is in slidable engagement with a trunnion bolt 8.

Held within suitable openings within the sides of the bridgeboard 1, as shown in Fig. 5, is a spool shaft 19, having a stop shoulder 20, against which is held a spool 21. This spool shaft has a threaded opening arranged to receive the eye bolt 23, to the eye of which is secured the upper end of a chain 24, this chain being arranged to wind upon this spool. In Fig. 2, we have shown a chain 24 connected to the bolt, the chain at its lower end by means of an ear 28, being secured to the auxiliary tread 10. The shaft 19, has the stop shoulder 42, limiting the movement of the shaft in that direction, and at its reduced end is provided with a nut 41, working on the washer 40.

Working against a rub plate 30, secured within one of the bridgeboards, as shown in Fig. 5, is the operating lever 31, which by means of the screw 32, is secured to the square end of the shaft 19. Held within a recess 34, extending transversely across one of the bridgeboards as shown in Fig. 8 is the spring detent 35, having the stop nosing 36', which is arranged to be engaged by the operating lever 31, to hold this lever in one of its extreme positions, as shown in Fig. 3. This detent 35, has an off-set handle forming end 36, arranged to be readily grasped by the operator's hand. Set adjacent to the shaft 19, is a stop pin 38, shown in Fig. 3, which limits the movement of the operating lever 31, in one direction.

Secured to the uppermost riser 2, of the car step as shown in Figs. 3 and 4, is a spring 39, against which one of the supporting rods 13, is stopped in the raised position of the rods.

The instrumentalities shown are so arranged that when the auxiliary tread 10, is lowered the weight thereof will be carried by the slotted hangers 7, the supporting rods 13, holding the tread in proper position. In the lowered condition of the tread 10, the chain 24, is unwound from the spool and in this condition of the shaft 19, the operating handle 31, is stopped against the pin 38, as shown in dotted lines in Fig. 3. Now when it is desired to bring the auxiliary step 10, out of working position, the operator simply grasps the lever 31, and throws the same downward and over the detent 36, which holds the lever in a spring locked position. When the lever is in its locked position, the chain is wound upon the spool, resulting in the tread 10, being carried upward and held snugly below the lowermost tread 3, of the permanent car step, as shown in Fig. 3. In this position of the auxiliary step or tread 10, the slotted hangers 7, are held in horizontal position immediately below the lower step, as clearly shown. The auxiliary step 10, is not quite as long as the distance between the two bridgeboards, so that cinders collected on the auxiliary step will have a chance to work off and over all four edges of the auxiliary step. The spring 39, assists in promptly throwing the auxiliary steps downward as soon as the operating lever 31, is released, this spring acting in addition to the weight of the auxiliary step 10, and the connecting bars.

As shown in Fig. 9, the trunnion bolt 8, not only gives support to the hanger 7, but holds the connecting bolt 17, in secured position within the auxiliary step.

A car step constructed according to our invention, is simple and comparatively inexpensive and both durable and efficient in operation and the operation of throwing the auxiliary step into position or out of working position may be accomplished with ease, accuracy and despatch.

Having thus described our said invention, what we claim as new and desire to secure by United States Letters Patent is:—

1. The combination with a car step, of two sets of brackets extending from the rear of the step each having a guide opening, two supporting bars held in parallel spaced relation within said openings each having a lower obliquely extending end with bolt openings, a shaft revolubly held within the bridgeboards of said step, a spool upon said shaft, a chain winding about said spool, a lever connected to said shaft, a detent to hold said lever in one position, a tread secured to said obliquely extending ends, said chain secured to said tread, oppositely spaced ears pivotally held to the lower ends of the bridgeboards of said step, a slotted hanger pivotally held to each ear, and a trunnion bolt secured to each end of said tread and held within the slot of a hanger.

2. The combination with a car step, of two sets of brackets extending from the rear of the step each having a guide opening, two supporting bars held in parallel spaced relation within said openings each having a lower obliquely extending end with bolt openings, a spring secured to said car step one of said supporting bars at times contacting with said spring, a shaft revolubly held within the bridgeboards of said step, a spool upon said shaft, a chain winding about said spool, a lever connected to said shaft, a detent to hold said lever in one position, a tread secured to said obliquely extending ends, said chain secured to said tread, oppositely spaced ears pivotally held to the lower ends of the bridgeboards of said step, a slotted hanger pivotally held to each ear, and a trunnion bolt secured to each end of said tread and held within the slot of a hanger.

3. The combination with a car step, of two sets of brackets extending from the rear of the step each having a guide opening, two supporting bars held in parallel spaced relation within said guide openings each having a lower obliquely extending end, a shaft having a threaded opening revolubly held within the bridgeboards of said step, a spool upon said shaft having an unthreaded opening, an eye bolt passing through said spool and threading into said shaft opening, a chain secured at one end to said eye bolt, a lever connected to said shaft, a detent to hold said lever in one position, a stop limiting the movement of said lever in an opposite direction, a tread secured to said obliquely extending ends, means to secure the remaining end of said chain to said tread, oppositely spaced ears pivotally held to the lower end of the bridgeboards of said step, a slotted hanger pivotally held to each ear, and a trunnion bolt secured to each end of said tread and held within the slot of a hanger.

In testimony whereof we affix our signatures, in presence of two witnesses.

CHARLES G. DUFFY.
JAMES R. WHITED.

Witnesses:
Geo. E. Noff,
W. H. Currier.

Copies of this patent may be obtained for five cents each, by addressing the "Commissioner of Patents, Washington, D. C."